US007860316B2

(12) United States Patent
Ohk

(10) Patent No.: US 7,860,316 B2
(45) Date of Patent: Dec. 28, 2010

(54) IMAGE FORMING APPARATUS THAT AUTOMATICALLY CREATES AN INDEX AND A METHOD THEREOF

(75) Inventor: Hyung-soo Ohk, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 11/430,123

(22) Filed: May 9, 2006

(65) Prior Publication Data

US 2007/0116359 A1 May 24, 2007

(30) Foreign Application Priority Data

Nov. 18, 2005 (KR) .................. 10-2005-0110952

(51) Int. Cl.
*G06K 9/66* (2006.01)
*G06K 9/72* (2006.01)

(52) U.S. Cl. ...................................... 382/194
(58) Field of Classification Search ............. 707/104.1; 358/462; 382/194
See application file for complete search history.

(56) References Cited

U.S. PATENT DOCUMENTS

| 5,276,616 | A | * | 1/1994 | Kuga et al. ............... 704/10 |
| 5,280,367 | A | * | 1/1994 | Zuniga ..................... 358/462 |
| 5,379,130 | A | * | 1/1995 | Wang et al. ............... 358/462 |
| 5,778,095 | A | * | 7/1998 | Davies ...................... 382/225 |
| 5,983,171 | A | * | 11/1999 | Yokoyama et al. ........ 704/10 |
| 6,002,798 | A | | 12/1999 | Palmer et al. |
| 6,201,902 | B1 | * | 3/2001 | Sasaki et al. .............. 382/309 |
| 2001/0035971 | A1 | * | 11/2001 | Koakutsu et al. ......... 358/1.13 |
| 2002/0037100 | A1 | * | 3/2002 | Toda et al. ................. 382/166 |
| 2003/0042319 | A1 | * | 3/2003 | Moore ...................... 235/494 |

FOREIGN PATENT DOCUMENTS

| JP | 08-137880 | 5/1996 |
| JP | 09-190449 | 7/1997 |
| JP | 09-282328 | 10/1997 |
| JP | 10-240958 | 9/1998 |
| JP | 2005-071014 | 3/2005 |
| KR | 1999-011327 | 2/1999 |

OTHER PUBLICATIONS

Chinese Office Action dated Dec. 21, 2007 issued in CN 200610149429.2.

* cited by examiner

*Primary Examiner*—James Trujillo
*Assistant Examiner*—Dawaune Conyers
(74) *Attorney, Agent, or Firm*—Stanzione & Kim, LLP

(57) ABSTRACT

An image forming apparatus capable of automatically creating an index, and a method for the same. The image forming apparatus includes a scan unit to scan a document, a text/image separation unit to separate the scanned document into a text area and an image area and to separate texts in the text area into symbols, an index determination unit to extract one or more properties of the separated symbols and to compare the extracted symbol properties with one or more index thresholds to determine whether text including the symbols is an index object, and an index page creation unit to create an index page including the text determined as the index object and information about a page including the text that corresponds to the index object. Accordingly, since the index page is automatically created, main contents of each page of the document can be easily selected and/or presented. Also, a search for desired contents in the document is facilitated by a link between the index page and original contents of the pages in the document, thereby improving user convenience.

29 Claims, 4 Drawing Sheets

400

How we got here...............1
Out Management Philosophy....2
CEO message..................3
Annual Report................4

IMAGE FORMING APPARATUS THAT AUTOMATICALLY CREATES AN INDEX AND A METHOD THEREOF

CROSS-REFERENCE TO RELATED APPLICATIONS

This application claims the benefit under 35 U.S.C. §119(a) of Korean Patent Application No. 2005-110952, filed Nov. 18, 2005, the entire contents of which are incorporated herein by reference.

BACKGROUND OF THE INVENTION

1. Field of the Invention

The present general inventive concept relates to an image forming apparatus, and a method of automatically creating an index in the image forming apparatus. More particularly, the present general inventive concept relates to an image forming apparatus that creates an index page that includes page information by extracting special texts that are distinctive from other general texts as an index when copying a plurality of document sheets, and a method of automatically creating the index page.

2. Description of the Related Art

Generally, image forming apparatuses can copy an image of a document by scanning a document sheet positioned on a document tray and can print an image identical to the copied image of the document. The image forming apparatuses may typically include a scanner, a copier, a printer, a facsimile, and a multi-function peripheral (MFP) in which the functions of the other apparatuses are combined.

In general, an image forming apparatus scans the document to transmit read data to an external device, such as a host device or another image forming apparatus. The image forming apparatus can also print out an image received from the external device or scanned by itself on a printing paper. When the document includes a plurality of sheets, the image forming apparatus also processes the document in the same manner.

However, when a conventional image forming apparatus processes a document having a plurality of sheets, a user is required to read the entire document to determine contents of the document transmitted to the external device, or printed. Additionally, the user may be required to create an index page manually using a host device or an application program. In this case an application program that runs on the host device is required. Moreover, the extra work required to create the index page causes an inconvenience for the user.

SUMMARY OF THE INVENTION

Accordingly, the present general inventive concept provides an image forming apparatus capable of automatically creating an index page, which includes page information, by extracting special texts that are distinctive from general texts as an index object from pages of a document, when copying a plurality of sheets of the document, and a method for the same.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image forming apparatus including a scan unit to scan a document, a text/image separation unit to separate the scanned document into a text area and an image area and to separate texts in the text area into symbols, an index determination unit to extract one or more properties of the separated symbols and to compare the extracted symbol properties with one or more index thresholds to determine whether text including the symbols is an index object, and an index page creation unit to create an index page including the text determined as the index object and information about a page including the text that corresponds to the index object.

The extracted symbol properties may include one or more of a symbol width, a symbol height, and a stroke width.

The index thresholds may be a reference value for determining an index-object symbol including one or more of a symbol width threshold, a symbol height threshold, and a stroke width threshold. The index thresholds may be set as an average value of preset symbol properties calculated based on variation of the preset symbol properties, or the index thresholds may be set by a user.

The index determination unit may determine the symbols as index-object symbols, classify the index-object symbols into groups, and determine the texts formed by the groups of the index-object symbols as index objects, when the extracted symbol properties are greater than the index thresholds.

The index page creation unit may link the determined index objects with pages including the text that corresponds to the index objects.

The foregoing and/or other aspects of the present general inventive concept may also be achieved by providing an image forming apparatus, including a text/image separation unit to receive data associated with a document having one or more pages and to determine a text area in the one or more pages, an index determination unit to determine one or more content indicating texts from among the text area in the one or more pages, and an index page creation unit to create an index page for the document including the one or more content indicating texts.

The foregoing and/or other aspects of the present general inventive concept may also be achieved by providing an image forming apparatus, including an index determination unit to distinguish among special content and general content in data associated with a document having one or more pages, and an index page creation unit to create an index including the special content as content indicators of the general content.

The foregoing and/or other aspects of the present general inventive concept may also be achieved by providing a method of automatically creating an index in an image forming apparatus, the method including scanning a document, separating the scanned document into a text area and an image area and separating texts in the text area into symbols, extracting one or more properties of the separated symbols and comparing the extracted symbol properties with one or more index thresholds to determine whether the text including the symbols is an index object, and creating an index page including the text determined as the index object and information about a page including the text that corresponds to the index object.

The extracted symbol properties may include one or more of a symbol width, a symbol height, and a stroke width.

The index thresholds may be a reference value for determining an index-object symbol including one or more of a symbol width threshold, a symbol height threshold, and a stroke width threshold. The index thresholds may be set as an average value of preset symbol properties calculated based on variation of the preset symbol properties, or the index thresholds may be set by a user.

The symbols may be determined as index-object symbols, the index-object symbols may be classified into groups, and texts formed by the groups may be determined as the index objects, when the extracted symbol properties are greater than the index thresholds.

The creating of the index page may include linking the determined index objects with pages including the text that corresponds to the index objects.

The foregoing and/or other aspects of the present general inventive concept may also be achieved by providing a method of automatically creating an index page in an image forming apparatus, the method including receiving data associated with a document having one or more pages and determining a text area in the one or more pages, determining one or more content indicating texts from among the text area in the one or more pages, and automatically generating the index page for the document including the one or more content indicating texts.

The foregoing and/or other aspects of the present general inventive concept may also be achieved by providing a method of automatically creating an index page in an image forming apparatus, the method including distinguishing among special content and general content in data associated with a document having one or more pages, and automatically generating the index page including the special content as content indicators of the general content.

The foregoing and/or other aspects of the present general inventive concept may also be achieved by providing a computer readable medium containing executable code to perform a method of automatically creating an index in an image forming apparatus, the medium including executable code to scan a document, executable code to separate the scanned document into a text area and an image area and separating texts in the text area into symbols, executable code to extract one or more properties of the separated symbols and comparing the extracted symbol properties with one or more index thresholds to determine whether the text including the symbols is an index object, and executable code to create an index page including the text determined as the index object and information about a page including the text that corresponds to the index object.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
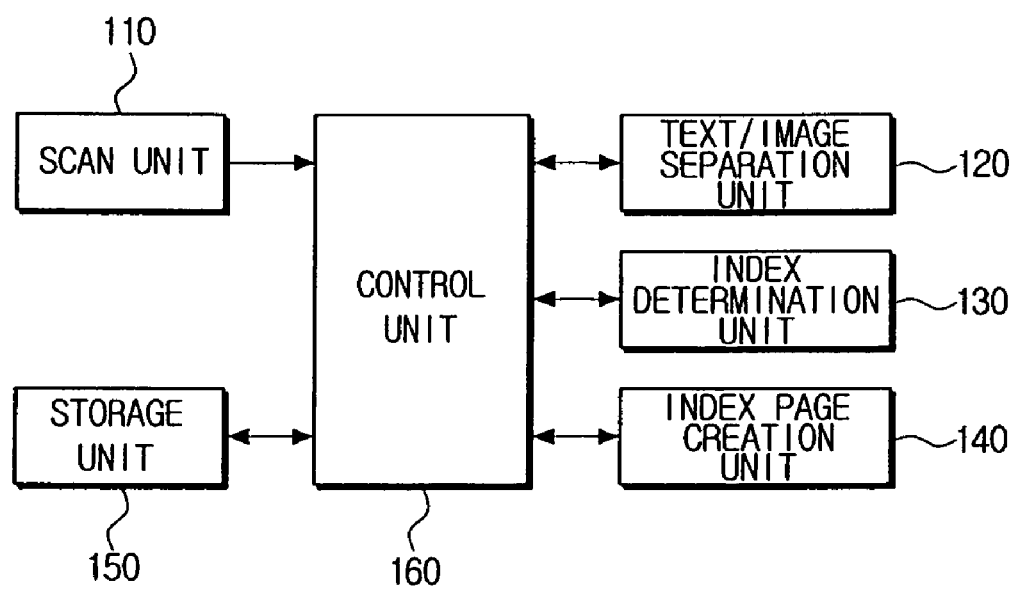
FIG. 1 is a block diagram illustrating an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus according to an embodiment of the present general inventive concept.

When copying a plurality of sheets of a document, the image forming apparatus of the present embodiment extracts one or more special texts that are distinctive from general texts from a text area included in each sheet of the document, and automatically creates an index page that includes the extracted texts and corresponding page information. Discrimination between the special texts and the general texts may be performed based on a size of the special texts, since titles, headings, or main contents of the document are usually larger than general texts. The special texts may be extracted from each page in the document or from pages in the document having a title, a heading, or main content.

Referring to FIG. 1, the image forming apparatus includes a scan unit 110, a text/image separation unit 120, an index determination unit 130, an index page creation unit 140, a storage unit 150, and a control unit 160.

The scan unit 110 scans a plurality of document sheets, page by page. The text/image separation unit 120 divides the document scanned by the scan unit 110 into (1) a text area including letters, numbers, and signs and (2) an image area including pictures, photos, and graphics. Additionally, the text/image separation unit 120 separates the respective texts of the text area into symbols (e.g., characters).

The index determination unit 130 extracts properties of the respective symbols separated by the text/image separation unit 120, and determines index-object symbols using the extracted properties of the symbols. That is, the index determination unit 130 determines extracted symbols that constitute main content, a title, or a heading of the document as the index-object symbols. Also, the index determination unit 130 classifies the determined index-object symbols within a minimum distance therefrom into groups, and determines the grouped index-object symbols, which is the texts, as an index object. Here, the index determination unit 130 groups index-object symbols that are close together such that each of the grouped index-object symbols constitutes a single index object.

The index page creation unit 140 creates an index page by arranging the texts determined as the index object by the index determination unit 130 and information about a page including the text that corresponds to the index object. The index creation unit 140 further inserts the created index page into the document as a first page of the document. Here, the index page creation unit 140 links the index page to the other original pages in the document. For example, the index page creation unit 140 can link certain objects in the index page to certain headings or titles in the document.

The storage unit 150 stores the document scanned by the scan unit 110 and the index page created by the index page creation unit 140.

The control unit 160 controls the text/image separation unit 120, the index determination unit 130, and the index page creation unit 140 to automatically create the index page based on the scanned document.

Figure 2:
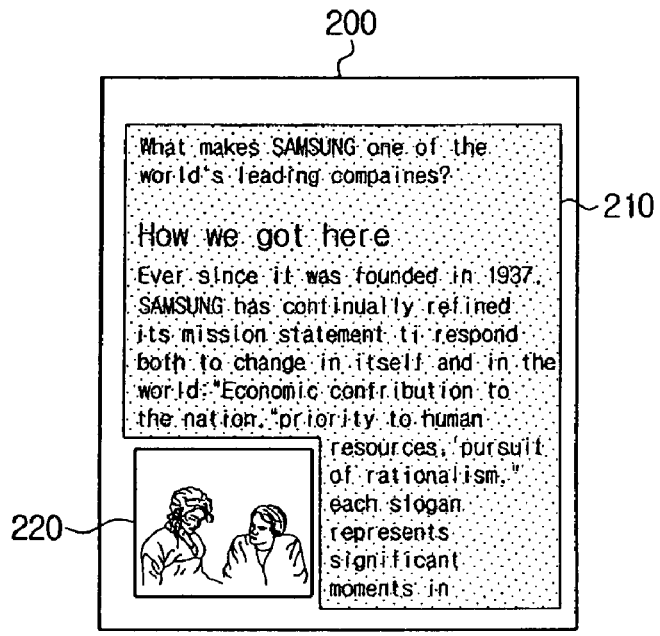
FIG. 2 is a view illustrating an operation of a text/image separation unit of the image forming apparatus of FIG. 1*t*.

FIG. 2 is a view illustrating an operation of the text/image separation unit 120 of the image forming apparatus of FIG. 1.

Referring to FIGS. 1 and 2, a first page 200 of the document to be copied includes a text area 210 and an image area 220.

After the scan unit 110 scans the first page 200 of the document, the text/image separation unit 120 separates the scanned first page 200 into the text area 210 and the image area 220.

The text/image separation unit 120 binarizes the separated text area 210 (i.e., by converting to a binary image having dots located at certain pixels), and separates the binarized texts using 8-neighborhood connected component into respective symbols. More particularly, the text/image separation unit 120 determines whether dots are located within 8 pixels connected around a certain pixel at which a dot is located, and separates one independent individual having connectivity into symbols. In other words, the text/image separation unit 120 examines 8 neighboring pixels of the certain pixels having dots in the text area 210 to separate individual symbols (e.g., characters) of the text area 210. For example, the text/image separation unit 120 separates "What" shown in the text area 210 into letters 'W', 'h', 'a', and 't', respectively.

Figure 3:
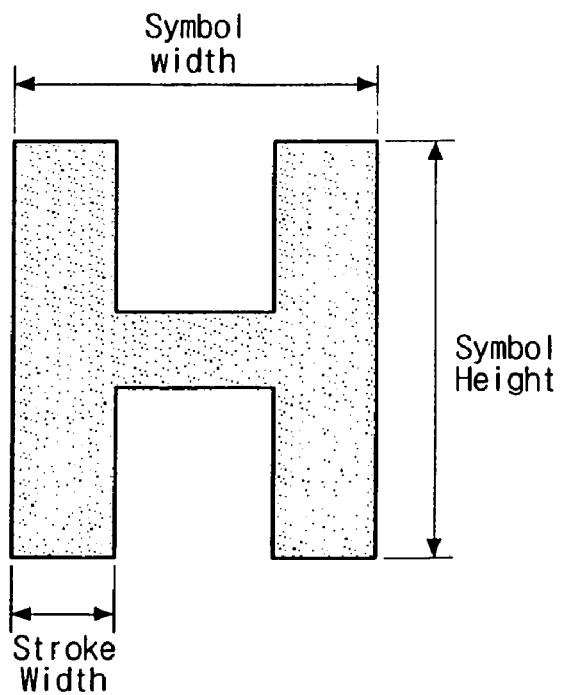
FIG. 3 is a view illustrating an operation of an index determination unit of the image forming apparatus of FIG. 1.

FIG. 3 is a view illustrating an operation of the index determination unit 130 of the image forming apparatus of FIG. 1.

Referring to FIGS. 1, 2, and 3, 'H' is a symbol separated from "How" which is in the second paragraph of the text area 210 of the first page 200.

The index determination unit 130 extracts properties of the symbols, for example, a symbol width, a symbol height, and a stroke width. More specifically, the index determination unit 130 extracts the symbol width by subtracting a minimum X-axis coordinate value (X_min) from a maximum X-axis coordinate value (X_max), and extracts the symbol height by subtracting a minimum Y-axis coordinate value (Y_min) from a maximum Y-axis coordinate value (Y_max). Furthermore, the index determination unit 130 determines whether the dots are located in pixels that are continuous in an X-axis direction, thereby extracting a number of dots of highest occurrence frequency as the stroke width. For example, in FIG. 3, since the occurrence frequency is the highest at a portion indicated by 'stroke width' in the symbol 'H', the index determination unit 130 extracts a width of the portion as the stroke width.

In addition, the index determination unit 130 compares the extracted symbol properties with preset index thresholds Th, respectively. The index threshold Th, which are reference values used to determine whether a symbol is an index-object symbol, include a symbol width threshold, a symbol height threshold, and/or a stroke width threshold. The index threshold Th may be an average value of symbol properties calculated based on a variation of the symbol properties, or set by a user. The index thresholds Th may be preset. When one of the extracted symbol properties is equal to or greater than the corresponding preset index threshold, the index determination unit 130 determines the symbol as the index-object symbol. In other words, if the symbol is large enough, the index determination unit 130 determines the symbol as the index-object symbol.

Likewise, the index determination unit 130 determines the index-object symbol with respect to all the symbols, separates the symbols determined as the index-object symbol into groups based on proximity, and recognizes the groups of the index-object symbols as objects of the index. Here, the index determination unit 130 may group the index-object symbols by considering a minimum distance among the index-object symbols, for example. As a result, a text "How we got here" of the first page 200 of the document may be determined as an object in the index.

Figure 4:
FIG. 4 is a view illustrating an index page creation unit of the image forming apparatus of FIG. 1.

FIG. 4 illustrates an operation of the index page creation unit 140 according to an embodiment of the present general inventive concept.

The index page creation unit 140 creates an index page 400 by arranging the texts determined as objects in the index by the index determination unit 130 and the information about page information including the texts that correspond to the index objects. The index page creation unit 140 also inserts the index page 400 into the document as the first page of the document. The index page 400 may alternatively be inserted into other parts of the document (e.g., a second page after a title page, a last page, etc.) At this stage, the index page creation unit 140 links the index page 400 to the original pages in the document so that when a user selects an index object (e.g., by selecting certain text) from the index page 400, the corresponding original page in the document may be selected and/or presented.

As illustrated in FIG. 4, the index page 400 includes the texts determined as the objects in the index and the page information including the texts that correspond to the index objects. In page 2 of the document, "Our Management Philosophy" is the text determined as a second index object in the index. In page 3 of the document, "CEO message" is the text determined as a third object of the index.

Accordingly, main contents of each original page in the document can be easily selected using the created index page 400. Moreover, since the index page 400 is linked to the original pages, search for desired contents can be facilitated.

Figure 5:
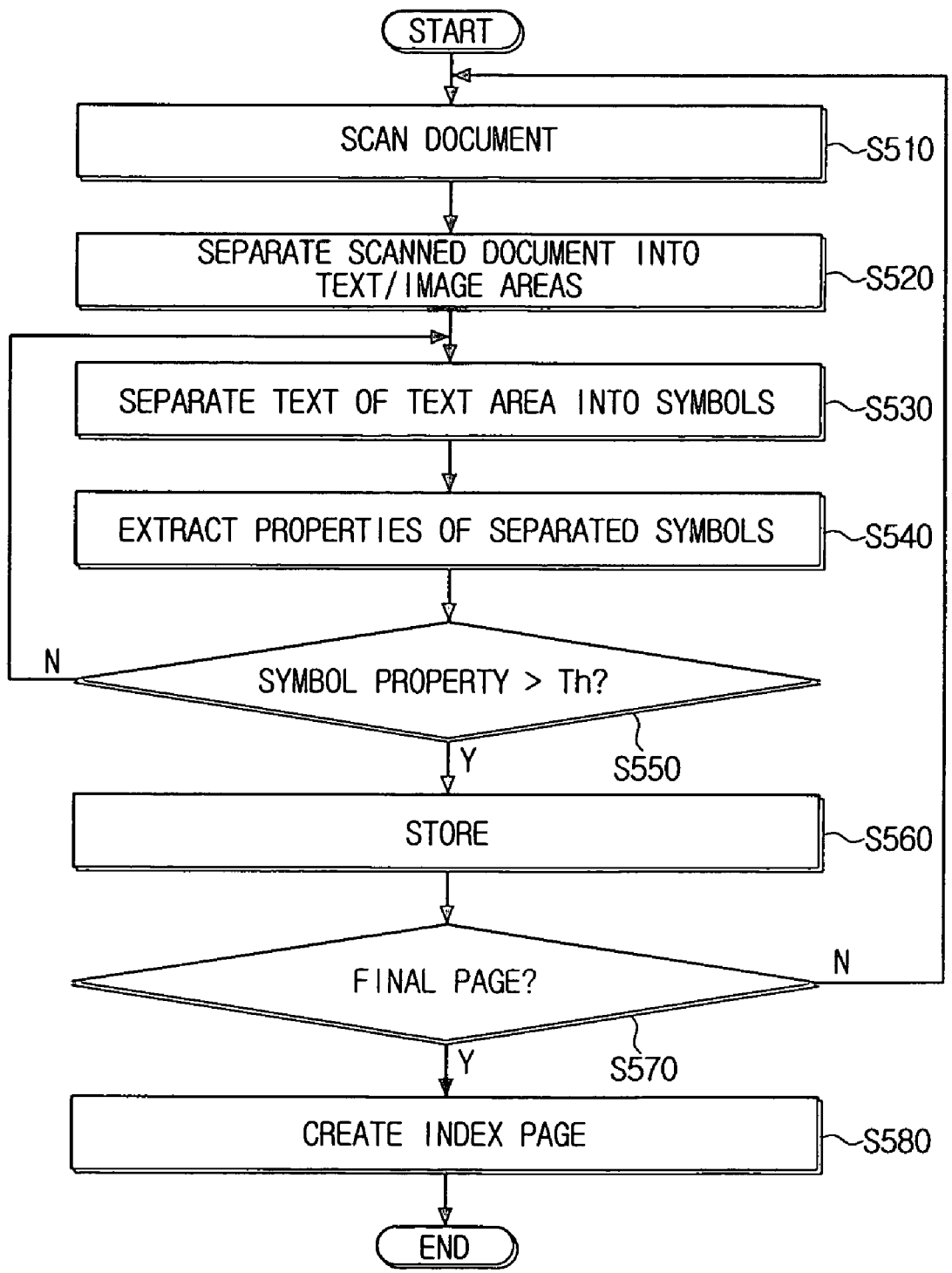
FIG. 5 is a flowchart illustrating a method of automatically creating an index in an image forming apparatus, according to an embodiment of the present general inventive concept.

FIG. 5 is a flowchart illustrating a method of automatically creating an index in an image forming apparatus, according to an embodiment of the present general inventive concept. The method of FIG. 5 may be performed by, for example, the image forming apparatus of FIG. 1. Accordingly, for illustration purposes, the method of FIG. 5 is described below with reference to FIGS. 1 to 5.

Referring to FIG. 5, the scan unit 110 scans the document, page by page (operation S510).

The text/image separation unit 120 separates the document scanned by the scan unit 110 into the text area and the image area (operation S520). Additionally, the text/image separation unit 120 separates the texts of the text area into symbols (operation S530).

The index determination unit 130 extracts the properties of the symbols separated by the text/image separation unit 120 (operation S540). In addition, the index determination unit 130 determines whether each of the extracted symbol properties is greater than the preset index thresholds Th (operation S550). Here, the index determination unit 130 compares the extracted symbol properties to the corresponding index thresholds Th (e.g., the symbol width threshold, the symbol height threshold, and the stroke width threshold), respectively. When any one of the extracted symbol properties is greater than the corresponding index threshold, the index determination unit 130 determines the symbol as the index-object symbol.

When the extracted symbol property is greater than the index threshold (operation S550-Y), the index determination unit 130 temporarily stores the index-object symbol (operation S560). The index determination unit 130 groups the temporarily stored index-object symbols, thereby forming texts objects from the grouped symbols.

The control unit 160 determines whether a page being processed is a final page of the document (operation S570). When it is determined that the page being processed is the final page in the document (operation S570-Y), the control unit 160 controls the index page creation unit 140 to arrange the texts determined as objects in the index by the index determination unit 130 and the information about the page including the texts objects, thereby creating the index page (operation S580). The operations S520 to S580 may be performed during or after the document is scanned in the operation S510.

The control unit 160 may control the image forming apparatus such that the index page created by the index page creation unit 140 is printed out on a printing paper, or output to an external display device, thereby being presented to the user.

Although the embodiments of the present general inventive concept describe creating the index page when the document is scanned, it should be understood that the present general inventive concept can be embodied when the document is received from other devices. For example, the present general inventive concept can be applied to document data received from an external device.

The embodiments of the present general inventive concept can be embodied as computer readable codes on a computer readable recording medium. The computer readable recording medium may include any data storage device that can store data which can be thereafter read by a computer system. Examples of the computer readable recording medium include a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. The embodiments of the present general inventive concept may also be embodied in hardware or a combination of hardware and software.

According to the above description of an embodiment of the present general inventive concept, since the index page is automatically created, main contents of original pages of the document can be easily selected and/or presented. Also, a search for desired contents is facilitated through the link between the index page and the contents of the original pages, thereby improving user convenience.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
a scan apparatus to scan a document received by the image forming apparatus;
a text/image separation apparatus to separate the scanned document into a text area and an image area, and to separate texts in the text area into symbols based on pixel data of the separated text area, where the text/image separation unit compares at least one pixel of the pixel data in the separated text area with a plurality of neighboring pixels to determine and separate individual symbols of the text area;
an index determination apparatus to extract one or more properties of the separated symbols and to compare the extracted symbol properties with one or more index thresholds that are set as an average value of preset symbol properties calculated based on a variation of the preset symbol properties, thereby determining whether text including the symbols is an index object; and
an index page creation apparatus to create an index page including the text determined as the index object and information about a page including the text, wherein the index determination apparatus determines the symbols as index-object symbols, groups the index-object symbols, and determines the texts comprising the groups of the index-object symbols as objects in the index, when the extracted symbol properties are greater than the index thresholds.

2. The image forming apparatus of claim 1, wherein the extracted symbol properties comprise one or more of a symbol width, a symbol height, and a stroke width.

3. The image forming apparatus of claim 1, wherein the index thresholds are a reference value to determine an index-object symbol, the index thresholds comprising one or more of a symbol width threshold, a symbol height threshold, and a stroke width threshold, or the index thresholds are set by a user.

4. The image forming apparatus of claim 1, wherein the index page creation apparatus links the determined index objects with pages including the text that corresponds to the index objects.

5. An image forming apparatus, comprising:
a text/image separation apparatus to receive data associated with a document that is received and scanned by the image forming apparatus, the document having one or more pages and to determine data for a text area in the one or more pages from the received data associated with the document;
an index determination apparatus to determine data for one or more content indicating texts from among the text area in the one or more pages of the document from the received data by selecting characters of the content indicating texts based on comparing a size of characters in the text area with a predetermined size threshold that is set as an average value of preset character properties calculated on a variation of the preset character properties, and grouping selected characters together based on relative proximity to one another; and
an index page creation apparatus to create index page data for an index page for the document including the one or more content indicating texts determined from the received data,
wherein the index determination apparatus receives data associated with separated symbols of the text area from the text/image separation unit, compares the data associated with separated symbols to one or more predetermined size parameters to determine whether the separated symbols are content indicating symbols, and groups adjacent ones of the content indicating symbols together and determines the grouped content indicating symbols as the content indicating texts for the index page and index page data.

6. The image forming apparatus of claim 5, further comprising:
a print unit to print the document having the one or more pages with the index page created by the index page creation unit from the received data and the created index page data.

7. The image forming apparatus of claim 5, wherein the text/image separation apparatus separates data from the received data associated with the document for an area having images, pictures, or graphics into an image area and an area having letters, numbers, or symbols into the text area.

8. The image forming apparatus of claim 5, wherein the text/image separation apparatus binarizes the determined text area and separates each symbol in the text area, and provides the separated symbols to the index determination unit.

9. The image forming apparatus of claim 8, wherein the text/image separation apparatus separates each symbol in the determined text area by examining each pixel dot and neighboring pixels.

10. The image forming apparatus of claim 5, wherein the index determination apparatus determines data for the one or more content indicating texts based on a text size comparison.

11. The image forming apparatus of claim 5, wherein the one or more predetermined size parameters comprise a stroke width of the separated symbols, a symbol width of the separated symbols, and a symbol height of the separated symbols.

12. The image forming apparatus of claim 5, further comprising:
a storage unit to store data related to each content indicating symbol determined by the index determination unit such that the index page creation unit accesses the storage unit to create the index page data for the index page.

13. The image forming apparatus of claim 5, wherein the index page creation apparatus creates the data for the index page so that it includes the content indicating texts associated with page indicators of pages of the document that include the content indicating texts.

14. The image forming apparatus of claim 5, wherein the index page creation apparatus adds the index page data to the data associated with the document.

15. The image forming apparatus of claim 5, wherein the index page creation apparatus links the data for the content indicating texts in the index page data with pages that are associated with the content indicating texts.

16. A method of automatically creating an index in an image forming apparatus, the method comprising:
scanning a document with a scan apparatus;
separating the scanned document with a text/image separation apparatus into a text area and an image area and separating texts in the text area into symbols based on pixel data of the separated text area by comparing at least one pixel of the pixel data in the separated text area with a plurality of neighboring pixels to determine and separate individual symbols of the text area;
extracting one or more properties of the separated symbols and comparing the extracted symbol properties with one or more index thresholds to determine whether the text including the symbols is an index object with an index determination apparatus, where the index thresholds are set as an average value of preset symbol properties calculated based on variation of the preset symbol properties; and
creating an index page with an index page creation apparatus including the text determined as the index object and information about a page including the text that corresponds to the index object,
wherein the symbols are determined as index-object symbols, the index-object symbols are grouped, and the texts including the groups of the index-object symbols are determined as objects in the index, when the extracted symbol properties are greater than the index thresholds.

17. The method of claim 16, wherein the extracted symbol properties comprise one or more of a symbol width, a symbol height, and a stroke width.

18. The method of claim 16, wherein the index thresholds comprise a reference value for determining an index-object symbol including one or more of a symbol width threshold, a symbol height threshold, and a stroke width threshold, or the index thresholds are set by a user.

19. The method of claim 16, wherein the creating of the index page comprises linking the determined index objects with pages including text that correspond to the index objects.

20. A method of automatically generating an index page in an image forming apparatus, the method comprising:
receiving data associated with a document having one or more pages and determining a text area in the one or more pages with a text/image separation apparatus;
determining one or more content indicating texts from among the text area in the one or more pages by selecting characters of the content indicating texts based on comparing a size of characters in the text area with a predetermined size threshold that is set as an average value of preset character properties calculated on a variation of the preset character properties, and grouping selected characters together based on relative proximity to one another with an index determination apparatus; and
automatically generating the index page for the document including the one or more content indicating texts with an index page creation apparatus,
wherein the determining of the one or more content indicating texts from among the text area in the one or more pages comprises:
receiving separated symbols of the text area; and
comparing the separated symbols to one or more predetermined size parameters to determine whether the separated symbols are content indicating symbols, and grouping adjacent ones of the content indicating symbols together; and
determining the grouped content indicating symbols as the content indicating texts for the index page.

21. The method of claim 20, further comprising:
printing the document having the one or more pages along with the generated index page.

22. The method of claim 20, wherein the determining of the text area in the one or more pages comprises separating an area having images, pictures, or graphics into an image area and an area having letters, numbers, or symbols into the text area.

23. The method of claim 20, wherein the determining of the text area in the one or more pages comprises binarizing the text area and separating each symbol in the text area.

24. The method of claim 23, wherein the determining of the one or more content indicating texts from among the text area in the one or more pages comprises separating each symbol in the text area by examining each pixel dot and neighboring pixels.

25. The method of claim 20, wherein the one or more predetermined size parameters comprise a stroke width of the separated symbols, a symbol width of the separated symbols, and a symbol height of the separated symbols.

26. The method of claim 20, further comprising:
storing each determined content indicating symbol such that the index page generation operation accesses the stored content indicating symbols to automatically generate the index page.

27. The method of claim 20, wherein the generating of the index page for the document including the one or more content indicating texts comprises generating the index page to include the content indicating texts associated with page indicators of pages of the document that include the content indicating texts.

28. The method of claim 20, further comprising:
adding the generated index page to the document.

29. The method of claim 20, further comprising:
linking the content indicating texts in the index page with pages that associated with the content indicating texts.

* * * * *